United States Patent [19]
Moore

[11] Patent Number: 4,465,166
[45] Date of Patent: Aug. 14, 1984

[54] ADJUSTABLE TEMPERATURE COMPENSATING CONSTANT FORCE SHOCK ABSORBER

[75] Inventor: James D. Moore, Redondo Beach, Calif.

[73] Assignee: J. D. Moore Engineering, Inc., Torrance, Calif.

[21] Appl. No.: 351,754

[22] Filed: Feb. 24, 1982

[51] Int. Cl.³ ............................................... F16F 9/52
[52] U.S. Cl. .................................. 188/278; 188/285; 188/287
[58] Field of Search ............... 188/276, 277, 287, 285, 188/299, 318, 278

[56] References Cited

U.S. PATENT DOCUMENTS

| | | | |
|---|---|---|---|
| 2,909,248 | 10/1959 | Gies | 188/277 |
| 3,076,529 | 2/1963 | Zeidler | 188/277 |
| 3,605,960 | 9/1971 | Singer | 188/287 |
| 4,059,175 | 11/1977 | Dressell, Jr. et al. | 188/285 |
| 4,153,145 | 5/1979 | Ellis et al. | 188/285 |

Primary Examiner—Bruce H. Stoner, Jr.
Assistant Examiner—Alvin E. Oberley
Attorney, Agent, or Firm—Lee W. Tower

[57] ABSTRACT

A rectangular metering member with transversal grooves is located with respect to specially formed apertures in a pressure tube of a hydraulic shock absorber to form orifices communicating between the shock absorber pressure tube and a reservoir. The orifices are adjusted in size automatically to account for hydraulic fluid viscosity changes as a function of temperature by a thermal expansion plug which moves the metering member to increase or decrease the size of the orifices. The metering member is also manually positionable to adjust the size of the orifices for loads of varying mass and velocity. The specially formed apertures in the pressure tube allow the automatic temperature compensation to operate independently of the initial manual adjustment of the metering member.

10 Claims, 6 Drawing Figures

ADJUSTABLE TEMPERATURE COMPENSATING CONSTANT FORCE SHOCK ABSORBER

BACKGROUND OF THE INVENTION

1. Field of the Invention

This invention relates generally to the hydraulic shock absorber art and more particularly to an improved shock absorber which has the capability to automatically adjust for fluid viscosity variations as a function of temperature.

2. Prior Art

Prior art hydraulic shock absorbers generally include a pressure tube, a piston connected to a piston rod slidably mounted in the pressure tube, orifices in the pressure tube communicating to a reservoir, and metering means for adjusting the size of the orifices. During load deceleration, hydraulic fluid in the pressure tube is forced through the orifices into the reservoir as the piston is forced by the load into the pressure tube.

The prior art discloses that by designing the orifices to be either exponentially sized and equally spaced along the pressure tube, or exponentially spaced along the pressure tube but equally sized the shock absorber provides a uniform stopping force as well as a uniform deceleration to the load throughout the piston stroke. This feature is exemplified by U.S. Pat. Nos. 4,133,415; 4,059,175; 4,174,098; 3,446,317; and 3,207,270.

In addition, the prior art shock absorbers have some mechanism for adjusting the effective size of the orifices between the pressure tube and the reservoir to adjust for loads with varying velocities and masses. One mechanism for adjusting the orifice size has been to mount a sleeve over the pressure tube so that apertures in the sleeve combine with the apertures in the pressure tube to form orifices between the pressure tube and the reservoir. By rotating the sleeve, the orifice sizes are increased or decreased. This class of metering mechanism is exemplified by U.S. Pat. Nos. 4,133,415; 4,059,175; 4,174,098; 3,750,856; and 3,510,117.

Other prior art discloses additional metering means. U.S. Pat. No. 4,164,274 discloses a metering spool with lands to adjust the size of the orifices. By rotating the spool, the spool is moved axially, thereby causing the lands to more or less cover apertures in the pressure tube. U.S. Pat. No. 3,446,317 discloses two mechanisms for adjusting the orifice's sizes: a rotatable rod with flat or chordal grooves, and a rotatable tubular member having a plurality of orifices of different diameters. U.S. Pat. No. 3,207,270 discloses a flow control member in the form of a wedge member mounted for longitudinal adjustment relative to an inclined support member.

A disadvantage of all of the prior designs is that although the orifices can be adjusted manually for varying loads, the orifices are not automatically varied in size as a function of temperature to account for variations in fluid viscosity. Thus, the prior art shock absorbers are not always properly adjusted for their loads.

The present invention is a shock absorber of the general type described above; however, the present invention is provided with a unique orifice metering means that operates to automatically compensate for changes in fluid viscosity as a function of temperature by automatically adjusting the effective orifice sizes.

The present invention also is less complex in construction than prior art shock absorbers, which are costly to manufacture and have many parts. The prior art shock absorbers are also difficult to maintain and must be manufactured to extremely close tolerances to eliminate undesirable leakage.

SUMMARY OF THE INVENTION

The hydraulic shock absorber of the present invention has two concentric cylinders with the inner cylinder closed on one end and having a piston on a rod slidably mounted into the other end. The annular space between the two concentric cylinders is closed at both ends thereby defining a reservoir surrounding the inner cylinder which is called a pressure tube.

Apertures are located along the pressure tube and overlying the apertures is a rectangular metering member with grooves on one side which together with the apertures form orifices communicating from the interior of the pressure tube to the reservoir surrounding the pressure tube.

The size of the orifices can be manually adjusted for varying size loads by moving the metering member grooves with respect to the apertures. This is accomplished by an external adjustment pin which bears on a guide pin which in turn mates with a guide hole on one end of the metering member. The other end of the metering member also has a guide hole for a mating guide pin, which is spring loaded.

A mechanism is provided for automatically adjusting the size of the orifices to compensate for fluid viscosity variations as a function of temperature. This is accomplished by locating a thermal expansion plug behind one of the metering member guide pins. Then, as the temperature of the shock absorber increases, the thermal expansion plug expands and moves the metering member and its grooves with respect to the apertures in a manner to decrease the effective size of the orifices, thereby accounting for the decreased viscosity of the hydraulic fluid. As the temperature decreases, the thermal expansion plug contracts thereby increasing the effective size of the orifices to account for the increased viscosity of the hydraulic fluid.

The apertures have a special noncircular form to effect a nearly constant percentage change in effective orifice size for a given change in temperature regardless of the starting position of the metering member grooves with respect to the apertures. This feature is important since it allows the manual adjustment for varying loads and the automatic compensation for temperature variation to be independent of one another. The apertures are formed to have a section that has a flat sidewall and two concave sidewalls. The two concave sidewalls come together at a point which is oriented to point away from the thermal expansion plug. By positioning the metering member grooves so that the point of the aperture is always open, the feature of nearly constant percentage change in orifice size is attained.

The apertures are approximately of equal size and spaced along a flat on the pressure tube in an arrangement which provides a uniform stopping force or deceleration to the load. The grooves in the metering member are spaced in the same manner.

When the piston is forced into the pressure tube by a load, hydraulic fluid is forced through the orifices and into the reservoir, thereby converting kinetic energy into thermal energy and stopping the load. After the load deceleration operation, a spring returns the piston to its initial position, and the hydraulic fluid returns to the pressure tube via a ball check valve.

BRIEF DESCRIPTION OF THE DRAWINGS

FIG. 6 is a sectional view illustrating the guide hole and guide pin alignment.

DESCRIPTION OF THE PREFERRED EMBODIMENT

Figure 1:
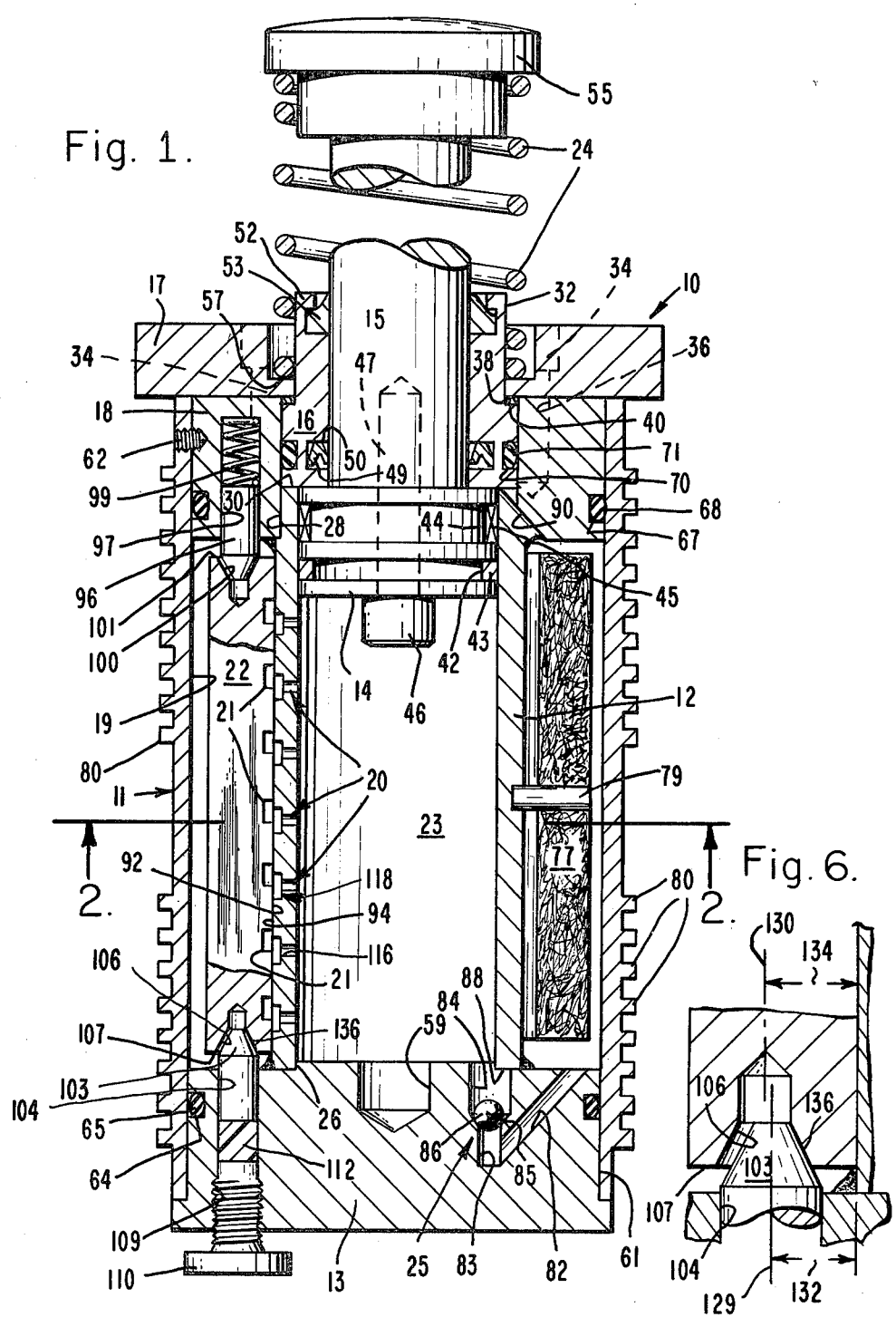
FIG. 1 is a longitudinal section view of a shock absorber made in accordance with the principles of the present invention.

Before explaining the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purposes of description and should not be regarded as limiting.

Referring to FIG. 1, the numeral 10 generally designates a shock absorber made in accordance with the principles of the present invention. The shock absorber 10 includes an outer cylinder 11, which surrounds inner cylindrical pressure tube 12. The pressure tube is sealed on one end by rear head 13, which also encloses one end of an annular space between the pressure tube 12 and outer cylinder 11.

Piston 14 is mounted on a piston rod 15, and then inserted into the end of the pressure tube opposite to rear head 13. The piston rod is slidably mounted within a sleeve bearing 16 which is in turn held in place by a mounting flange 17 and a front head 18. The front head also encloses the other end of the annular space between the pressure tube and the outer cylinder, which is referred to as reservoir 19.

Apertures 20 in the pressure tube and grooves 21 in an overlying metering member 22 form orifices between the pressure tube interior 23 and reservoir 19. During a load deceleration operation the piston advances into the pressure tube 12, thereby forcing fluid through the orifices into the reservoir.

Due to the spacing of the orifices, less orifice area is open to fluid flow as the piston proceeds down the pressure tube, thereby creating a constant stopping force. After a load deceleration operation, spring 24 returns the piston to its initial position and ball check valve 25 opens, thus permitting fluid to flow from the reservoir 19 back to the pressure tube interior 23.

Figure 2:
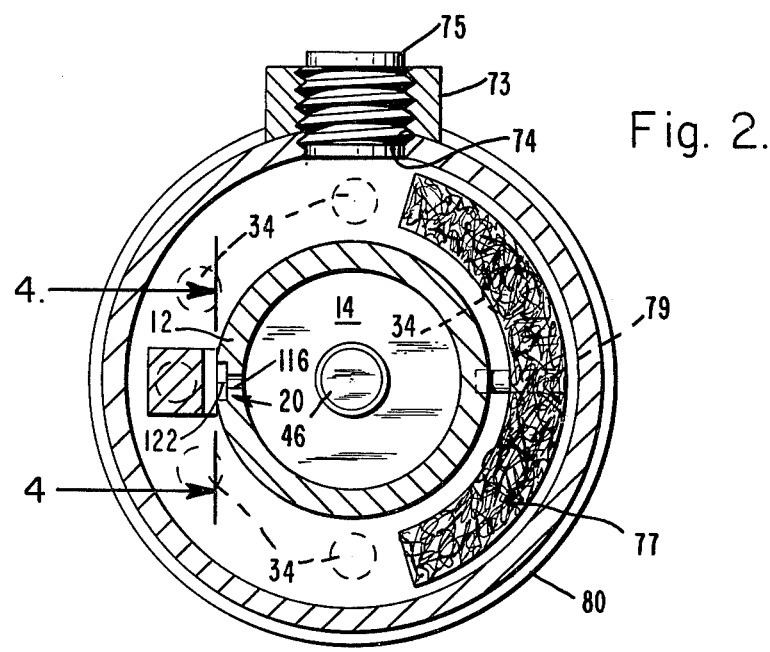
FIG. 2 is a transverse sectional view of the shock absorber structure illustrated in FIG. 1, taken along the line 2—2 thereof, and looking in the direction of the arrows.

More specifically and again referring to FIG. 1, the rear head 13 is welded to pressure tube 12 with reduced diameter portion 26 extending slightly into the pressure tube. The cylindrical front head 18 is attached to the pressure tube 12 by sliding the front head over a reduced diameter front end portion 28 of the pressure tube. Then the front head is welded to the pressure tube. The sleeve bearing 16 is cylindrical with a maximum outer diameter slightly less than the cylindrical front head inner diameter but larger than the inner diameter of the pressure tube. This allows the sleeve bearing to slide into the hole defined by the front head inner diameter until the front end 30 of the pressure tube is encountered. The sleeve bearing 16 is held in this position by mounting flange 17 which is slid over the reduced diameter front end 32 of the sleeve bearing and attached to the front head by retaining bolts as indicated at numeral 34, which extend as shown in FIG. 2 into threaded tap holes 36 in the front head. Wave washer 38 is inserted between the sleeve bearing and the mounting flange at cylindrical edge 40 in the sleeve bearing to adjust for any slight variations in manufacturing dimensions. The result is a firm fit between the sleeve bearing and the pressure tube front end 30.

Again referring to FIG. 1, the piston 14 is cylindrical with an outer diameter slightly less than the inner diameter of the pressure tube. A reduced diameter circular groove 42 is formed at one end of the piston in order to provide a seating for floating piston ring 43 and a second groove 44 is formed to provide a seating for piston bearing 45. This piston is mounted axially on the piston rod 15 and retained there by retaining screw 46 which passes through a hole in the center of the piston into a threaded bore hole 47 in the piston rod. A piston rod seal 49 is seated within groove 50 on the inner surface of the sleeve bearing. A flange 52 on the sleeve bearing is formed to hold a piston rod wiper 53 around the piston rod and a cap 55 is mounted on one end of the piston rod. Spring 24 is located around the piston rod and retained on one end by a seat formed by the interface between bore 57 in the mounting flange 17 and the reduced diameter front end 32 of the sleeve bearing. The other end of spring 24 is retained on the piston rod by cap 55. A bore hole 59 in the rear head provides a clearance hole for the piston retaining screw 46 so that the piston can be driven into the entire length of the pressure tube.

As shown in FIG. 1, the outer cylinder 11 is mounted over a reduced diameter portion 61 of the rear head and over the front head. Locking screw 62 is used to lock the outer cylinder in place. Groove 64 in the surface of the rear head provides a seat for O-ring seal 65 between the rear head and the outer cylinder. In a similar manner, groove 67 provides a seat of O-ring seal 68 between the front head and the outer cylinder. Also, groove 70 on the surface of the sleeve bearing provides a seat for O-ring seal 71 between the front head and the sleeve bearing.

As shown in FIG. 2, a cylindrical fill port 73 is welded onto the outer cylinder over bore hole 74 in the outer cylinder so that reservoir 19 and the pressure tube interior 23 can be filled with hydraulic fluid. The inner surface of the fill port is threaded so that a suitable filler plug 75 can be installed. A cellular material 77, which may be formed of a cellular plastic filled with nitrogen to give it a high degree of resilience, is located in the interior of reservoir 19 and is held in place by retaining pin 79, which is suitably attached to the pressure tube. Also shown in FIG. 1 and FIG. 2 are flanges integral with the outer cylinder which provide heat exchanger fins 80 for dissipating the thermal energy produced as the shock absorber operates.

As previously described, the interior of the pressure tube and the reservoir are connected by a plurality of orifices formed as indicated in FIG. 1 by apertures 20 in the pressure tube and transverse grooves 21 in metering member 22. Ball check valve 25 and fluid return path 82 also connect the pressure tube interior and the reservoir. Another orifice 90 communicates from the reservoir to the space in the pressure tube formed between the piston and the sleeve bearing as the piston drives into the pressure tube.

The purpose of the orifices defined by the apertures in the pressure tube and the grooves in the metering member is to provide a uniform stopping force as well as a uniform rate of deceleration throughout the stroke of the piston caused by an impact force on the cap 55 mounted on the piston rod. During a load decelerating operation, the inward stroke of the piston forces fluid from the pressure tube through the apertures and grooves into the reservoir, thereby converting the kinetic energy of the load into thermal energy. The cellular material 77 is compressed during the load deceleration operation; thus, increasing the space available in the reservoir to hold hydraulic fluid. The ball check valve 25 effectively closes off the fluid return path 82 during this load decelerating process. After the load decelerating process, spring 25 returns the piston to its initial impact receiving position and ball check valve 25 opens to provide a low pressure fluid return path from the reservoir to the pressure tube. Also, as the piston returns to its initial impact receiving position, fluid path 90 allows any hydraulic fluid that is between the piston and the sleeve bearing to escape into the reservoir.

The ball check valve 25 comprises a bore hole 83 drilled in the rear head with its center line approximately even with a point on the circumference of reduced diameter portion 26 of the rear head, a larger diameter bore hole 84 in line with bore hole 83, and a concave surface 85 between the larger bore hole 84 and the smaller bore hole 83 to provide a seat for ball 86. Fluid return path 82 is provided by drilling a hole angularly through the rear head so that when the shock absorber is assembled, the fluid return path communicates from the reservoir to bore hole 83. During a load decelerating operation, ball 86 is forced by the pressure differential between the pressure tube interior and the reservoir into the seat provided by concave surface 85, thereby closing the ball check valve. As the spring returns the piston to its initial impact receiving position after a load decelerating operation, the pressure reverses, which forces the ball out of the seat and the ball check valve opens thereby providing a low pressure fluid return path from the secondary reservoir to the primary reservoir. The ball 86 is retained within bore hole 84 by the rear edge 88 of the pressure tube.

Shown in FIG. 1 and FIG. 2 is metering member 22, which may be formed as a rectangular rod having transverse grooves 21 across flat edge 92. The metering member is located over a flat 94 formed on the pressure barrel and apertures 20 also lie along this flat. The grooves are spaced along the metering member at the same distances as the apertures are along the flat, so that an aperture along with a corresponding groove in the metering member forms an orifice between the reservoir and the pressure tube.

The metering member is held in place by coaxial guide pins which extend into guide holes in each end of the metering member. As shown in FIG. 1, a guide pin 96 is slidably mounted in bore hole 97 in front head and guide pin spring 99 is also located in bore hole 97. The guide pin 96 consists of a circular rod with a conical taper on one end, which mates with a conically shaped guide hole 100 in the forward end 101 of the metering member.

Similarly, guide pin 103 is slidably mounted in bore hole 104 in the rear head. This guide pin is also a circular rod with a conically tapered end to mate with a conically shaped guide hole 106 on the rear end 107 of the metering member. A threaded portion 109 is included on one end of the bore hole 104 that extends through the rear head. A suitable threaded adjustment pin 110 is mounted into threaded portion 109 so that the adjustment pin engages a thermal expansion plug 112. As shown in FIG. 1, the thermal expansion plug is located in bore hole 104 between the adjustment pin and the guide pin. The adjustment screw and the guide pin spring allow the position of the grooves on the metering member to be moved with respect to the apertures on the pressure tube so that the orifices formed can be increased or decreased in size to adjust for various loads.

The thermal expansion plug 112 is provided to automatically adjust the position of the meter member grooves with respect to the apertures in response to temperature variations to compensate for fluid viscosity changes as a function of temperature. When the shock absorber is at a low temperature the hydraulic fluid viscosity is high and thus there is a high resistance to fluid flow. The thermal expansion plug adjusts for this by contracting at low temperatures and thereby allowing guide pin spring 99 to move the meter member grooves more in alignment with the apertures resulting in larger orifices between the pressure tube interior and the reservoir. When the shock absorber is at a high temperature, such as after extensive use, the hydraulic fluid viscosity is low and thus there is little resistance to fluid flow. In this case, the thermal expansion plug expands with the high temperature, thereby pushing the guide pin 103 and in turn the metering member 22 so that the metering member grooves are less in alignment with the apertures, resulting in smaller orifices between the pressure tube interior and the reservoir. The thermal expansion plug can be made of rubber and other suitable materials that expand at high temperatures and contract at low temperatures.

If the thermal compensation is not desired, then the space normally occupied by the expansion plug can be filled by a longer guide pin 103 or by having sufficient travel on adjustment pin 110.

Figure 3:
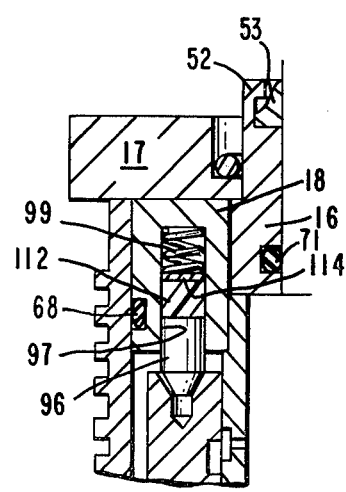
FIG. 3 is a sectional view of an alternate location for the thermal expansion plug.

FIG. 3 shows an alternate configuration for the location of the thermal expansion plug. In this embodiment, bore hole 104 in the rear head contains only an adjustment pin 110 and a guide pin 103, while as shown in FIG. 3, bore hole 97 in the front head contains a guide pin 96, a thermal expansion plug 112, a disc 114, and a guide pin spring 99. The disc 114 acts to separate the spring 99 from the thermal expansion plug 112. The thermal expansion plug still operates to increase the orifices' sizes at low temperatures and decrease the orifices' sizes at high temperatures to account for fluid viscosity as a function of temperature.

Figure 4:
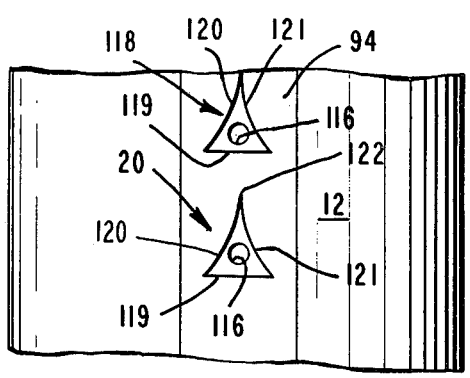
FIG. 4 is a sectional view of the pressure tube taken along the line 4—4 in FIG. 2 looking in the direction of the arrows and illustrating one configuration for the pressure tube apertures.

The apertures 20 shown in FIG. 1 and FIG. 2 are shown in more detail in FIG. 4, which is a view looking at the flat 94 of the pressure tube. As shown, the apertures consist of a radial inner section having a circular bore hole 116 extending from the inner surface of the pressure tube and a radial outer section 118 with two concave sidewalls and one flat sidewall communicating with circular bore hole 116 and the exterior surface of the pressure tube. As FIG. 4 illustrates, section 118 has a flat sidewall 119, a concave sidewall 120, and a second concave sidewall 121. The flat sidewall 119 is aligned so that the flat sidewall edge on the flat 94 of the pressure tube is parallel to a tangent on the circular rear edge 88 of the pressure tube. Concave sidewalls 120 and 121 each start at the flat sidewall and meet at a point 122, which points toward the front head 18. The bore hole 116 can be formed by drilling and an electrical discharge machine can be used to form section 118 with flat and concave sidewalls.

The purpose of the shape of the apertures is to provide a means whereby the effective orifice size formed by the apertures and the grooves can be varied by an approximately constant percentage regardless of the starting position of the grooves with respect to the apertures. This allows the manual adjustment of the metering member for loads of varying masses and velocities to operate independently of the automatic adjustment for temperature variations. Section 118 having a flat sidewall and two concave sidewalls provides this function as explained below.

The maximum effective orifice size is obtained when the metering member is positioned so that the grooves in the metering member completely open each aperture. Suppose the metering member is moved a distance R towards the front head so that each aperture is blocked an amount determined by a length R along the bottom edge 92 of the metering member, thereby decreasing the effective orifice size between the pressure tube interior and the reservoir. When the metering member is moved an additional distance R for a total of 2R from its starting position, the effective orifice size is even smaller. The quotient computed as the difference in effective orifice size caused by moving the metering member a distance R divided by the effective orifice size when the apertures are completely open, approximately equals the quotient computed as the difference in effective orifice size caused by moving the metering member towards the front head an additional distance R for a total of 2R divided by the effective orifice size when the metering member is moved only R towards the front head.

The benefit of this constant percentage change in the effective orifice size is that once the metering member has been manually adjusted via the adjustment pin 110 to account for varying loads, the thermal expansion plug 112 will operate independently to adjust the effective orifice size to account for changes in hydraulic fluid viscosity as a function of temperature regardless of the starting position of the metering member.

Figure 5:
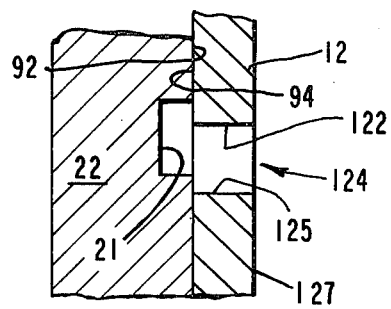
FIG. 5 is a sectional view of an alternate configuration for the apertures in the pressure tube.

An alternate method of forming the apertures is shown in FIG. 5. In this embodiment, an aperture 124 is formed with a flat sidewall 125 and two concave sidewalls extending from the flat surface 94 on the pressure tube to the inner surface 127 of the pressure tube. Thus, a drill hole 116 as shown in FIG. 4 is not used in this embodiment, and an aperture in the shape of section 118 of FIGS. 1, 2, and 4 extends clear through the pressure tube. The apertures formed in this manner are also suitable for providing for a constant percentage change in the effective orifice size as a function of temperature regardless of the metering member's initial position.

For the embodiment shown in FIG. 3, the thermal expansion plug 112 is located in bore hole 97 and the apertures in the pressure tube are formed as shown in FIG. 4 or FIG. 5; however, the apertures are oriented with point 122 pointing towards the rear head instead of the front head. This configuration is necessary to provide for always progressively blocking off the apertures starting at the flat sidewall 119 or 125 so that point 122 is always open to the corresponding groove. If point 122 is never blocked by the bottom edge 92 of the metering member, then each interface between the apertures in the pressure tube and the grooves in the metering member will always have a flat edge and two concave edges, thereby having the proper shape to provide a constant percentage change in effective orifice area as a function of temperature change regardless of the metering member's initial position.

The apertures in the pressure tube in all the above described embodiments can be of approximately equal size. Also, the apertures can be approximately equally spaced along the pressure tube. The grooves in the metering member are spaced in the same manner. This arrangement provides a uniform stopping force as well as a uniform deceleration throughout the piston stroke.

An important feature of the present invention is the manner in which the metering member 22 is positioned on the flat 94 of the pressure tube. As described above, the metering member is positioning axially by means of the adjustment pin 110, the thermal expansion plug 112, and guide pins 103 and 96, and the guide pin spring 99. FIG. 6 illustrates for guide hole 106 and bore hole 104 how the metering member is aligned vertically and horizontally with respect to the flat 94 on the pressure tube. This is accomplished by positioning the bore holes 104 and 97 in the rear head and front head, respectively, so that the distance of the center line 129 of the bore holes to the flat 94 on the pressure tube is less than the distance of the center line 130 of guide holes 106 and 100 in the metering member rear end 107 and metering member front end 101, respectively, to the bottom edge 92 of the metering member. As illustrated on FIG. 6, the distance indicated by numerical 132 must be less than the distance indicated by numeral 134. Also, the conical taper 136 on both guide pins 103 and 96, and guide holes 106 and 100 must be at nearly the same angle. With these features, the guide pin will bear down on guide hole 106 on the surface closest to the bottom edge of the metering member, thereby aligning the metering member horizontally with respect to the guide pins in the front head and rear head, and vertically with respect to the pressure tube. This design also compensates automatically for any wear on the surfaces of the guide pin and the guide hole.

What is claimed is:
1. A shock absorber comprising:
   means defining a pressure chamber and a reservoir having hydraulic fluid communication through at least one aperture in said pressure chamber for providing deceleration to a load wherein said aperture in said pressure chamber is formed with a circular hole section communicating to a section having two concave sidewalls and one flat sidewall;
   a metering member overlying said aperture in said pressure chamber that may be adjusted with respect to said aperture in order to increase or decrease the size of said aperture; and
   a thermal expansion plug that automatically as a function of temperature adjusts the position of said metering member with respect to said aperture thereby increasing or decreasing said aperture which is oriented with said two concave sidewalls joining together to point away from said thermal expansion plug.

2. A shock absorber comprising:

means defining a pressure chamber and a reservoir having hydraulic fluid communication through at least one aperture in said pressure chamber for providing deceleration to a load wherein said aperture is formed with two concave sidewalls and one flat sidewall;

a metering member overlying said aperture in said pressure chamber that may be adjusted with respect to said aperture in order to increase or decrease the size of said aperture; and a thermal expansion plug that automatically as a function of temperature adjusts the position of said metering member with respect to said aperture thereby increasing or decreasing said aperture which is oriented with said two concave sidewalls joining together to point away from said thermal expansion plug.

3. The shock absorber of claim 1 or claim 2 which further comprises:

first guide pin means on one end of said metering member;

second guide pin means on other end of said metering member and operating together with said first guide pin means to align said metering member on said pressure chamber;

spring means bearing on said first guide pin means; and adjustment pin means bearing on said second guide pin means.

4. The shock absorber of claim 3 wherein:

said pressure chamber comprises a tube sealed on one end;

a piston means is slidably mounted within said pressure chamber; and a plurality of spaced ones of said aperture are formed in said pressure chamber that together with a like plurality of grooves in said metering member form orifices communicating from said pressure chamber to said reservoir.

5. The shock absorber of claim 4 which further comprises:

a return spring for moving said piston back to its initial impact receiving position after a load deceleration operation; and a ball check valve for providing a one way low pressure fluid return passage from said reservoir to said pressure chamber as said piston moves back to its initial impact receiving position after a load deceleration operation.

6. The shock absorber of claim 5 which further comprises:

a sleeve bearing mounted on one end of said pressure chamber;

an outer cylinder surrounding said pressure chamber and forming said reservoir between exterior of said pressure chamber and said outer cylinder;

a cellular material located in said reservoir;

a rear head enclosing one end of said pressure chamber and said outer cylinder;

a front head engaging said sleeve bearing and said pressure chamber and enclosing one end of said reservoir; and a mounting flange attachable to said front head.

7. The shock absorber of claim 6, wherein:

said first guide pin means and said second guide pin means comprise guide pins slidably mounted in bore holes in said shock absorber, engaging guide holes in each end of said metering member and located so that the distance from the center line of said bore holes to said pressure chamber is less than the distance from the center line of said guide holes to said pressure chamber thereby providing horizontal and vertical alignment between said metering member and said pressure chamber.

8. A hydraulic shock absorber comprising:

a pressure chamber having at least one aperture;

a reservoir;

a means for manually adjusting the size of said aperture in said shock absorber for loads of varying mass and velocity;

a metering member overlying said aperture in said pressure chamber and responsive to said means for manually adjusting the size of said aperture;

a thermal expansion plug which adjusts the position of said metering member with respect to said aperture thereby increasing or decreasing the size of said aperture automatically as a function of temperature;

first guide pin means on first end of said metering member;

second guide pin means on second end of said metering member and operating together with said first guide pin means to align said metering member on said pressure chamber;

spring means bearing on said first guide pin means;

adjustment pin means bearing on said second guide pin means;

a piston means slidably mounted within said pressure chamber;

a plurality of spaced ones of said aperture formed in said pressure chamber that together with a like plurality of grooves formed in said metering member form orifices communicating from said pressure chamber to said reservoir;

a return spring for moving said piston back to its initial impact receiving position after a load deceleration operation;

a ball check valve for providing a one way low pressure fluid return passage from said reservoir to said pressure chamber as said piston moves back to its initial impact receiving position after a load deceleration operation;

a sleeve bearing mounted on one end of said pressure chamber;

an outer cylinder surrounding said pressure chamber and forming said reservoir between exterior of said pressure chamber and said outer cylinder;

a cellular material located in said reservoir;

a rear head enclosing one end of said pressure chamber and said outer cylinder;

a front head engaging said sleeve bearing and said pressure chamber and enclosing one end of said reservoir;

a mounting flange attachable to said front head; and wherein said first guide pin means and said second guide pin means comprise guide pins, slidably mounted in bore holes in said shock absorber, engaging guide holes in each end of said metering member and located so that the distance from the center line of said bore holes to said pressure chamber is less than the distance from the center line of said guide holes to said pressure chamber thereby providing horizontal and vertical alignment between said metering member and said pressure chamber.

9. A shock absorber comprising:
- a pressure chamber having at least one aperture;
- a reservoir;
- a metering member overlying said aperture in said pressure chamber;
- first guide pin means on first end of said metering member;
- second guide pin means on second end of said metering member and operating together with said first guide pin means to align said metering member on said pressure chamber;
- spring means bearing on said first guide pin means;
- adjustment pin means bearing on said second guide pin means;
- a piston means slidably mounted within said pressure chamber;
- a plurality of spaced ones of said apertures formed in said pressure chamber that together with a like plurality of grooves formed in said metering member form orifices communicating from said pressure chamber to said reservoir;
- a return spring for moving said piston back to its initial impact receiving position after a load deceleration operation;
- a ball check valve for providing a one way low pressure fluid return passage from said reservoir to said pressure chamber as said piston moves back to its initial impact receiving position after a load deceleration operation;
- a sleeve bearing mounted on one end of said pressure chamber;
- an outer cylinder surrounding said pressure chamber and forming said reservoir between exterior of said pressure chamber and said outer cylinder;
- a cellular material located in said reservoir;
- a rear head enclosing one end of said pressure chamber and said outer cylinder;
- a front head engaging said sleeve bearing and said pressure chamber and enclosing one end of said reservoir;
- a mounting flange attachable to said front head; and
- wherein said first guide pin means and said second guide pin means comprise guide pins, slidably mounted in bore holes in said shock absorber, engaging guide holes in each end of said metering member, and located so that the distance from the center line of said bore holes to said pressure chamber is less than the distance from the center line of said guide holes to said pressure chamber thereby providing horizontal and vertical alignment between said metering member and said pressure chamber.

10. In a shock absorber for providing a decelerating force to a machine part by means of a piston which forces hydraulic fluid from a pressure chamber to a reservoir through a plurality of orifices formed by a plurality of apertures in said pressure chamber and a metering member which is manually adjustable to increase or decrease the size of said orifices for varying size loads wherein the improvement comprises:
- a thermal expansion plug which adjusts the position of said metering member with respect to said apertures thereby increasing or decreasing the size of said plurality of orifices as a function of temperature; and
- said apertures in said pressure chamber are each formed with a flat sidewall and two concave sidewalls.

* * * * *